United States Patent [19]
Marvy

[11] Patent Number: 5,233,380
[45] Date of Patent: Aug. 3, 1993

[54] FILM HOLDER STRAP AND FILM IDENTIFIER

[76] Inventor: James Marvy, 41 12th Ave. North, Hopkins, Minn. 55343

[21] Appl. No.: 680,303

[22] Filed: Apr. 4, 1991

[51] Int. Cl.⁵ .................. G03B 17/26; G03B 19/00
[52] U.S. Cl. ........................ 354/283; 354/354; 294/150
[58] Field of Search ............ 354/283, 276, 277, 284; 24/16 PB, 16 R, 17 B, 17 R, 303, 306; 294/137, 138, 141, 149, 150, 156, 165

[56] References Cited

U.S. PATENT DOCUMENTS

| | | | |
|---|---|---|---|
| 292,196 | 1/1884 | Ayer | 24/16 R |
| 2,450,841 | 10/1948 | Moore | 354/283 X |
| 2,497,270 | 2/1950 | Panosian | 354/277 |
| 2,552,905 | 5/1951 | Panosian | 354/284 |
| 2,946,271 | 7/1960 | Craig | 354/284 |
| 3,030,680 | 4/1962 | Wilhelm | 24/303 |
| 3,091,168 | 5/1963 | Craig | 354/284 |
| 3,372,438 | 3/1968 | Rinecker | 24/16 R |
| 4,868,955 | 9/1989 | Magnant et al. | 24/306 |

*Primary Examiner*—D. Rutledge
*Attorney, Agent, or Firm*—Palmatier, Sjoquist & Helget

[57] ABSTRACT

An identifying strap for holding one or more film holders and identifying the film therein. After a sheet of film has been inserted in a film holder, identification of the inserted sheet of film is difficult without opening the film holder in a darkroom. The present strap identifier identifies the type of film in the film holder and allows a photographer to organize film holders according to film type, type of photograph taken, or any other criteria. The strap identifier also includes slip means for drawing the strap back onto itself to tighten the strap about one or more film holders.

29 Claims, 3 Drawing Sheets

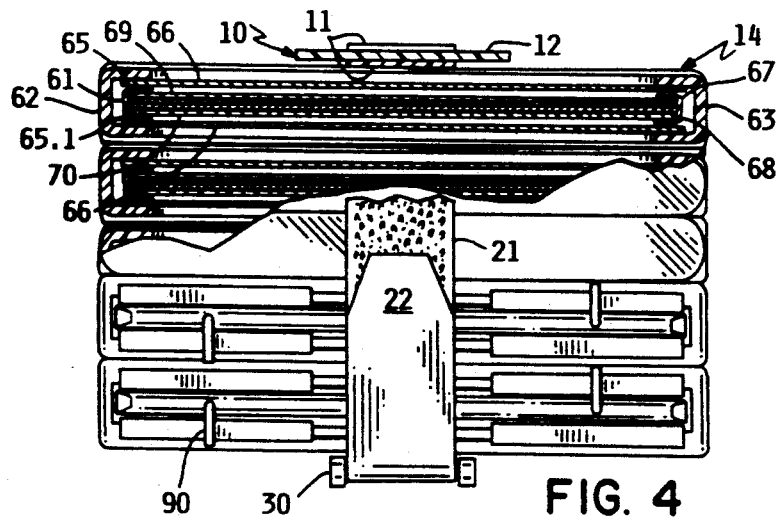
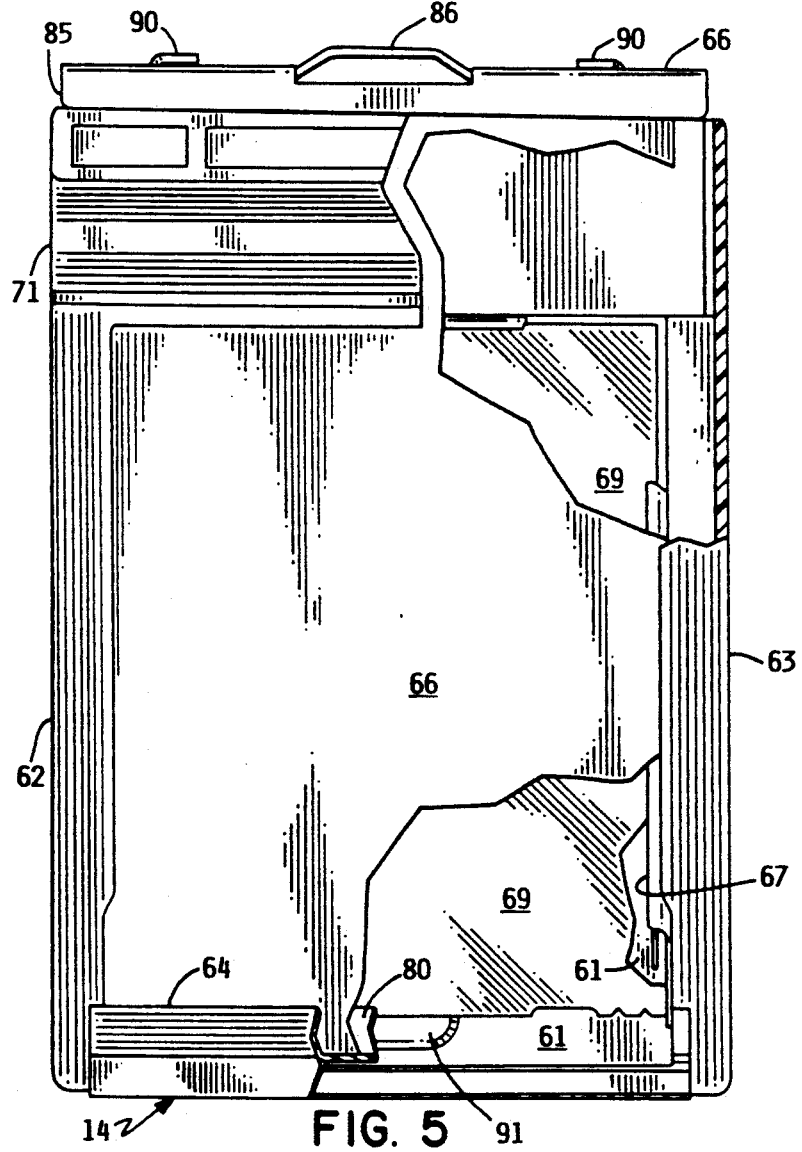
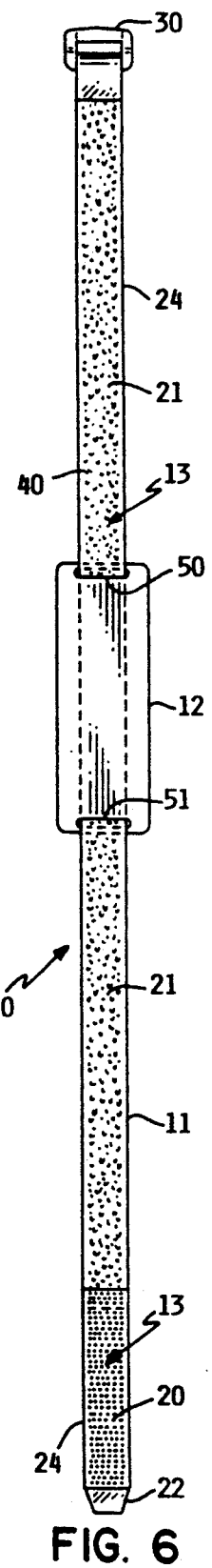
FIG. 4
FIG. 5
FIG. 6

FILM HOLDER STRAP AND FILM IDENTIFIER

The present invention relates to film holders for sheet film for view cameras and, more particularly, to an identifying strap for holding one or more film holders and identifying the type of film contained therein.

BACKGROUND OF THE INVENTION

A film holder is a structure for holding sheet film for view or field cameras. The film holder is impenetrable to light when closed. For exposure of the sheet film, "dark slides" are pulled from the film holder.

The conventional film holder typically holds two sheets of film which are loaded into the film holder in, for example, a darkroom. Subsequently, whether in the studio or on location, the film holder itself is then inserted into the view or field camera, whereupon the dark slide confronting the shutter is removed from the film holder to expose the film relative to the shutter. When the shutter is opened, light is directed upon the film. The dark slide is then slid back into the film holder before the film holder is removed from the camera. The second sheet of film is similarly exposed except that the film holder simply faces the opposite way when in the camera.

One of the problems with film holders is identifying the type of film loaded into the holder. A typical film holder includes portions receptive to grease pencils for labeling the film holder. Some photographers may tape a label to the film holder or use a readily removable label such as a Post-it TM note.

Another problem with film holders is organization. A photographer may shoot dozens of photographs of a subject utilizing different types of films and different camera settings. It is burdensome and time consuming to locate the unmarked or haphazardly labeled film which is desired for insertion into the camera, especially when time is of the essence such as when the photographer's subject is the rising or setting sun or a restless toddler.

A number of problems exist with conventional film holder fasteners. For example, masking tape leaves a sticky residue when removed from a film holder, and this sticky residue may attract dirt which subsequently may be introduced into a view camera. Moreover, masking tape is easily torn and not reusable, thereby requiring the photographer to lug around a sufficient quantity of the tape. Also, an excessive amount of masking tape is typically required to hold more than four or five film holders together in a stable fashion. Similarly, two to three rubberbands may be required to hold four or five or more film holders together in a tight bundle. Furthermore, rubberbands are adjustable or expandable only to a certain degree.

Still another problem with film holders is that the dark slides are somewhat flexible even when fully engaged in the film holder and may be inadvertently depressed onto the light sensitive side of the sheet of film. This may cause a smudging or smearing of the light-sensitive chemicals on the film sheet, or allow light to leak into the film holder, and ruin the photo taking qualities of the film.

SUMMARY OF THE INVENTION

An object of the present invention is to provide means for organizing film holders for view cameras.

Another object of the present invention is to provide means for identifying the type of film loaded into film holders for view cameras.

A feature of the present invention is the combination of view camera film holders and a strap for holding a set of film holders together.

Another feature is the provision in such a combination, of the strap having a label for identifying the type of film loaded in the film holders.

Another feature is the provision in such a combination, of the strap having connection means extending more than one-half of its length to form loops of various sizes around different quantities of film holders.

Another feature is the provision in such a combination, of the strap having connection means which are incrementally adjustable longitudinally to form loops of various sizes around different quantities of film holders.

Another feature is the provision in such a combination, of the connection means being incrementally adjustable laterally relative to the width of the strap to allow connection of the strap even with imperfect alignment of the connection means relative to the strap.

Another feature is the provision in such a combination, of one end of the strap including slip means for slidably engaging the other end of the strap such that the strap via the slip means is drawable back onto itself to tighten the strap around one or more film holders.

An advantage of the present invention is that film holders for view cameras may be readily organized according to film type, exposed or unexposed film, or any other criteria.

Another advantage is that the film in such film holders may be easily and quickly identified, such as when working with different types of film on the same shoot.

Another advantage is that film holders may be protected from rough handling by being readily bundled into secure stacks. When stacked, all of the film holders are protected except the top and bottom film holders. Moreover, even with the top and bottom film holders, only the sheets of film covered by the uppermost and lower most dark slides are prone to being smeared when their respective dark slides are inadvertently depressed. Furthermore, depression of the dark slides may allow light to leak into the film holder and stacking prevents such depression.

Another advantage is that one identifying strap may be utilized for bundling one or more film holders.

Another advantage is that film holders may be easily transported in their bundled form, as the present invention turns a loose stack of film holders into a single convenient-to-carry package.

Another advantage is that the present invention facilitates communication between the photographer and the processing lab, as the film may be dropped off at the processing lab while still in the bundled and identified film holders.

Another advantage is that the strap which is disconnected from the film holder may be connected about a respective film box to communicate to the film processor or photographer's assistant or lab technician how the film should be processed. A film box is a light-tight structure into which film from film holders is downloaded. A film box holds a plurality of sheets of film in a relatively small space.

Another advantage is the strap may be used with 4×5 inch or 8×10 inch film holders, the European 9×10 cm film holder or the obscure 5×7 inch film holder.

Other advantages are that the strap has an estimated life cycle of 20,000 pulls, is easy to connect and disconnect, is strong in sheer (side-to-side) and tension (top-to-bottom) strength, does not bunch or fuzz up, and includes an end which is blunted and tabbed to be user friendly.

BRIEF DESCRIPTION OF THE DRAWINGS

FIG. 4 is a partial section view at lines 4—4 of FIG. 1.

FIG. 5 is a top plan view of a film holder.

FIG. 6 is a top plan view of the identifying strap with a label plate.

DETAILED DESCRIPTION OF THE PREFERRED EMBODIMENT

Figures 1, 2:
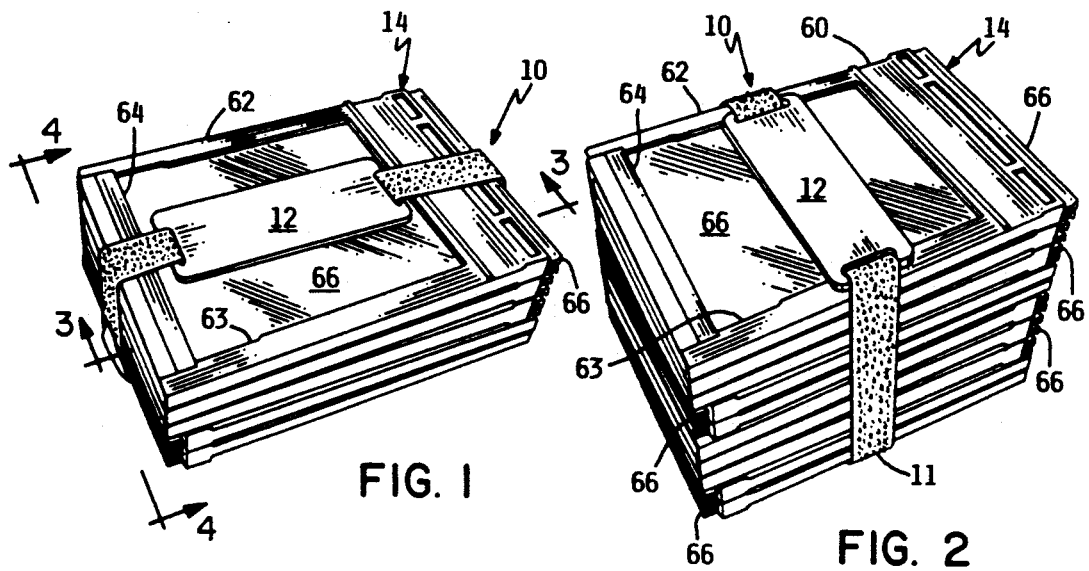
FIG. 1 is a perspective view of the identifying strap wrapped longitudinally about a set of five film holders for view cameras.
FIG. 2 is a perspective view of the identifying strap wrapped laterally about a set of ten film holders for view cameras.
Figure 7:
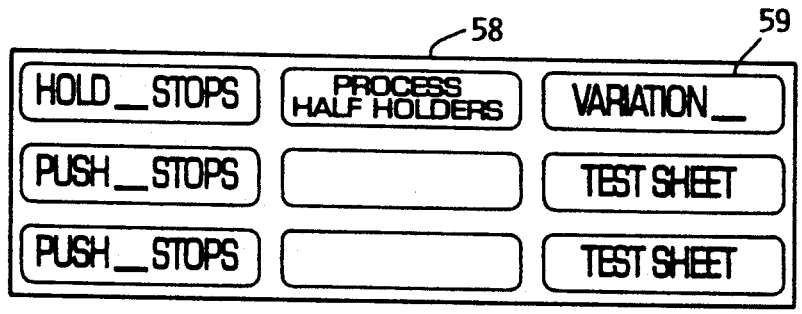
FIG. 7 is a top plan view of a sheet of pressure sensitive adhesive tags for the label plate of the strap of FIG. 6.

As shown in FIGS. 1, 2, and 7, the present identifying strap is indicated in general by the reference numeral 10. The strap 10 includes an elongate flexible element 11 engaging an identifying label plate or identifying indicia means 12 for identifying the type of film in a film holder. The element 11 includes connection or adhesive means 13 for forming a loop out of the strap 10 for strapping a set of view camera film holders 14 together firmly for organization and transportation.

Figure 4A:
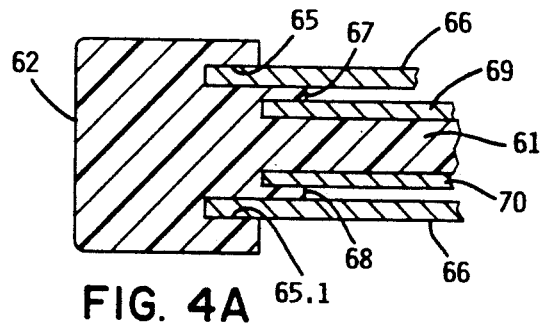
FIG. 4A is a detail, partial, simplified view of a film holder.
Figure 3:
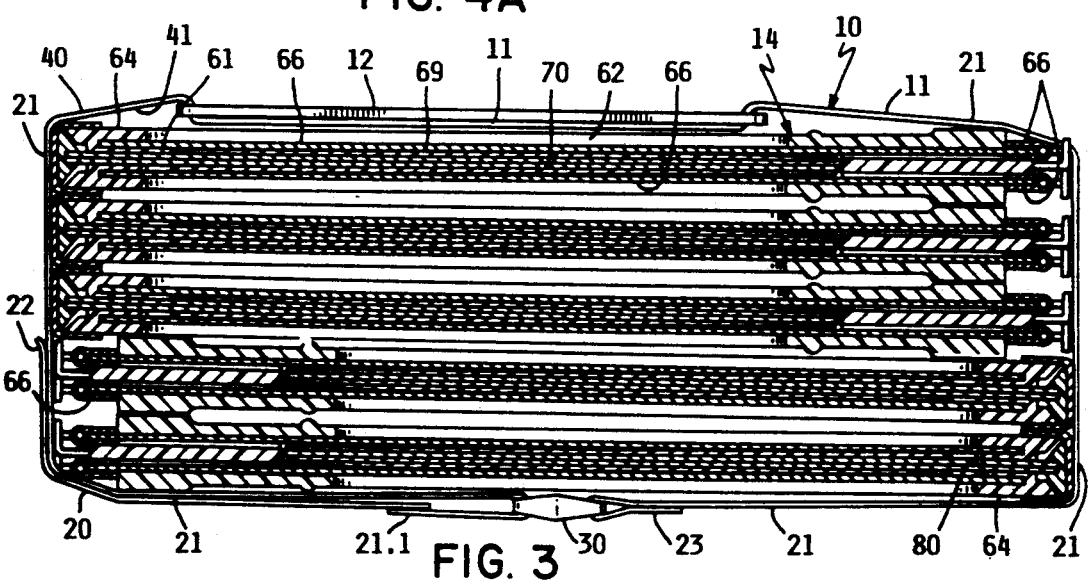
FIG. 3 is a section view at lines 3—3 of FIG. 1.

The elongate element 11 is formed of a flexible, durable, chemically resistant, fabric-like, woven nylon base and includes two types of connection means 13, specifically, a hook connector portion 20 and loop connector portion 21. The loop and hook connector portions 20, 21 may be stitched together as shown at portion 21.1. The hook connector portion 20 is disposed near one end 22 of the element 11 and is formed of a plurality of 8 mm monofiliment hooks with a concentration of approximately 330 hooks per square inch. The loop connector portion 21 runs for substantially the remaining length of the element 11 to an opposite end 23. Each of the plurality of loops in the loop connector portion 21 is formed of a texturized nylon. The concentration of the loops is measured by the weight of loop material per square inch; the present loop connector portion includes a concentration of 0.015 ounces of loop material per square inch. The elongate element 11 has a pair of edges 24 or selvedges that will not ravel with a width of 3/32 inch. The edge 24 lacks the connection means 13. As seen in FIGS. 4 and 6, the connector portions 20 and 21 of the connector means 13 are both spaced from the side edges 24 of the flexible element 11 as to be less susceptible to picking up dirt. When the hook and loop connector portions 20, 21 are mated, the resulting thickness of the hooks and loops of the two portions 20, 21 is approximately ⅛ inches thick. The connection means 13 remains operable for approximately 20,000 pulls. The element 11 is resistant to chemicals used in a photoprocessing lab such as strong alkalines, acids, trichloroethylene, acetone, hydrocarbons, and alcohols. The preferred connection means 13 is marketed under the federally registered trademark APLIX® which is owned by Aplix, 75116 Paris, France.

End 22 of the element 11 is blunted for safety and is tabbed so as to include no hook or loop connectors 20, 21. In other words, the end 22 is free of such connectors 20, 21 and accessible for being pinched or gripped to facilitate a separation of the mating hook and loop connector portions 20, 21.

End 23 of the element 11 includes a tongueless buckle or slip means 30 for receiving strap end 22, hook connector portion 20, and a section of the loop connector portion 21, all of which are fed through the buckle 30 and drawn back onto the element 11 to mate hook connector portion 20 to a section of the loop connector portion 21. The buckle 30 is rotatably connected to end 23 via the element 11 being looped around a portion of the buckle 30 and stitched to itself. The free swinging or rotation of the buckle 30 provides a tight fit about a corner or edge of a film holder 14 when the buckle 30 happens to be positioned at such an edge.

Element 11 includes an upper face 40 and a lower face 41. The upper face 40 includes the connection means 13. The lower face 41 of the element 11 is typically disposed so as to confront the film holders 14.

The identifying label plate 12 includes two elongate slots 50, 51 for engaging the elongate element 11. The plate 12 is preferably rigid, but may be formed of a pliable, flexible material. The plate 12 typically includes the brand name of a type of film and a code for identifying or classifying the film. The code may include one or two rectangular blocks of a lighter color or a certain shading. Moreover, the blocks may be marked with a writing utensil such as a grease pencil to indicate how the film should be processed.

Figure 8:
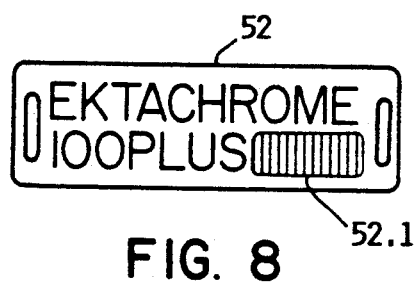
FIG. 8 is top plan view of a label plate for outdoor film.

As shown in FIG. 8, a label plate 52 is used with the brand name EKTACHROME 100 PLUS film. A rectangular block 52.1 is colored or coded blue to indicate that such film is typically used outdoors. Grease pencil markings may also be made on block 52.1.

Figure 9:
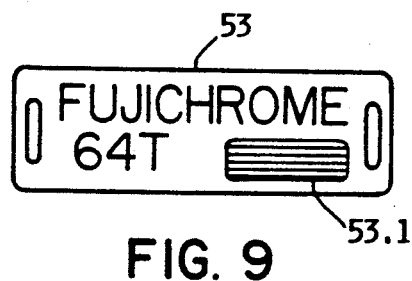
FIG. 9 is a top plan view of a label plate for indoor film.

As shown in FIG. 9, a label plate 53 is used with the brand name FUJICHROME 64T film. A rectangular block 53.1 is colored or coded red to indicate that such film is used with incandescent or quartz light. Grease pencil markings made be made on block 53.1.

Figure 10:
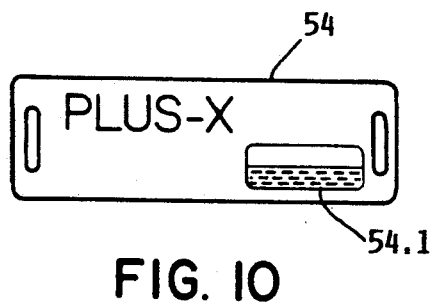
FIG. 10 is a top plan view of a label plate for black and white film.

As shown in FIG. 10, a label plate 54 is used with the brand name PLUS-X film. Rectangular block 54.1 is coded or shaded white and gray to indicate that such film is for black and white photographs. Grease pencil markings may may be made on rectangular block 54.1.

Figure 11:
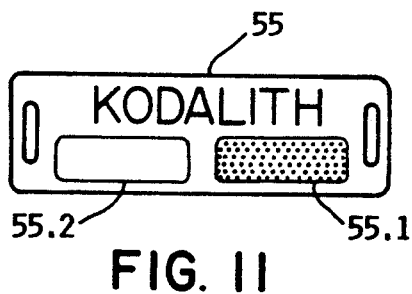
FIG. 11 is a label plate for half-tone film.

As shown in FIG. 11, a label plate 55 is used with the brand name KODALITH film. A rectangular block 55.1 includes a standard code or shading for half-tone film. Another rectangular block 55.2 on the plate 55 is white for being marked with a grease pencil, as such markings may be difficult to read on block 55.1.

Figure 12:
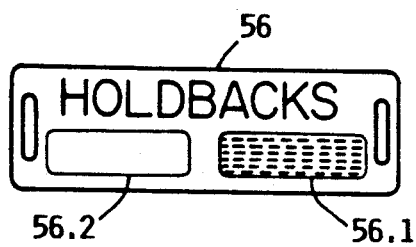
FIG. 12 is a label plate for unprocessed, exposed film held back from processing for insurance against problems in the processing lab with the primary film.

As shown in FIG. 12, a label plate 56 is entitled HOLDBACKS to indicate those film holders containing unprocessed, exposed film held back from the processing lab for insurance against loss or processing problems with the primary film. Rectangular blocks 56.1 and 56.2 of the plate 56 are colored green and white respectively for being marked such as with special processing instructions.

Figure 13:
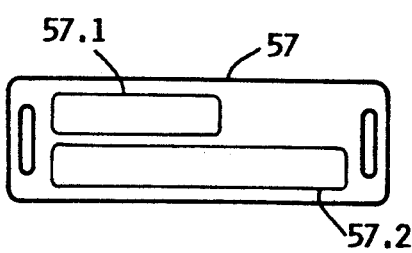
FIG. 13 is a label plate for miscellaneous film.

A generic or blank label 57 is shown in FIG. 13 and includes shorter and longer respective blocks 57.1 and 57.2 for receiving marking such as with a grease pencil. Label 57 may be used to identify miscellaneous types of film, or to classify the film according to other criteria.

A code sheet or backing 58 with removable pressure sensitive adhesive tags 59 is an alternative to marking the rectangular blocks 52.1, 53.1, 54.1, 55.1, 55.2, 56.1, 56.2, 57.1, and 57.2 with grease pencils. The tags 59 are removable from the sheet 58 and applied to such rectangular blocks.

A typical film holder 14 includes a substantially rectangular opaque frame 60 extending generally about an opaque divider or septum 61. The frame 60 includes a pair of side, opposing, elongate frame portions 62, 63 and a pair of hinged bottom flaps 64. Each of the elongate frame portions 62, 63 includes a pair of channels 65, 65.1 for engaging a pair of dark slides 66. Channels 65 are disposed on one side of the divider 61 for engaging one of the dark slides 66; channels 65.1 are disposed on the other side of the divider 61 for receiving the other dark slide 66. Each of the elongate frame portions 62, 63 further include a pair of film-retaining flanges 67, 68 with flanges 67 disposed on one side of the divider 61 and retaining one sheet of film 69 on the divider 61. Flanges 68 are disposed on the other side of the divider 61 for retaining a second sheet of film 70 on the other side of the divider 61. An upper portion 71 of the frame 60 of the film holder 14 typically includes light valves or seals which engage the dark slides 66. It should be noted that although frame portion 62 is shown for clarity in FIG. 4A as being one-piece, this frame portion 62 and the film holder 14 as a whole may be formed with a plurality of parts. See the patents incorporated by reference below.

Each of the flaps 64 is hinged or swingably connected to the bottom end of the divider 61 between the elongate frame portions 62, 63. Each of the flaps 64 includes a slot 80 which is alignable with one of the channels 65, 65.1 to engage one of the dark slides 66. Engagement of one of the dark slides 66 with its respective slot 80 locks the flap 64 relative to the frame members 62, 63 and provides two separate respective light-tight boxes for film sheets 69, 70.

A shoulder or handle 85 mounted on each of the slides 66 abuts the frame 60 when the slides 66 are fully engaged in the film holder 14. Each of the sides of the shoulder 85 typically includes a visual code means for indicating whether the respective sheet of film is unexposed or exposed. Conventionally, one side of the shoulder 85 is formed of a strip of white plastic or unpainted silver metal strip such as aluminum to indicate that the underlying film is unexposed. The other side of the shoulder 85 is formed of a strip of black plastic or metal such as aluminum which has been painted black to indicate that the underlying film has been exposed. Thus, before a picture is taken, the slide 66 is engaged in the film holder 14 with the strip of white plastic or the silver, unpainted metal strip facing outwardly. After a picture has been taken, the dark slide 66 is reinserted in the film holder 14 with the strip of black plastic or black painted metal strip facing outwardly.

Each of the handles or shoulders 85 includes an accessible handle portion 86 extending therefrom for readily pulling the slides 66 from the film holder 14. The accessible handle portion 86 is formed of a rod swingably mounted in the handle 85, but alternatively may be tab-like in form and offset from the middle of the shoulder 85.

The divider 61 includes upper and lower ends, and two sides or faces upon which the film sheets 69, 70 lay. The upper ends of the divider 61 include rotatable bent rod locks 90 for engaging the shoulders 85 on the slides 66 to prevent inadvertent slippage of the slides 66 from the film holder 14. Each of the sides or faces of the divider 61 may include adjacent its lower end a depression 91 for slipping a fingernail underneath the respective film sheet 69 or 70 to facilitate removal of the film sheets 69, 70 from the film holder 14 for processing.

As to the structure and function of the film holders 4, the following references are incorporated by reference: U.S. Pat. No. 2,450,841 issued to Moore on Oct. 5, 1948, U.S. Pat. No. 2,497,270 issued to Panosian on Feb. 14, 1950, U.S. Pat. No. 2,552,905 issued to Panosian on May 15, 1951, U.S. Pat. No. 2,946,271 issued to Craig on Jul. 26, 1960, and U.S. Pat. No. 3,091,168 issued to Craig on May 28, 1963.

In operation, each of the film holders 14 to be taken to a shooting are loaded with two sheets of film. A sheet of film is loaded by pulling out one of dark slides 66 at least partially to disengage the slide 66 from its respective slot 80 of one of the flaps 64. The respective flap 64 is then swung downwardly to expose the respective film-retaining flange 67 or 68. The sheet of film is then slid between the respective flange 67 or 68 and the divider 61. After the sheet of film has been fully inserted, the flap 64 is swung upwardly and onto the divider 61 and the dark slide 66 is pushed into the slot 80 to lock the flap 64 relative to the elongate frame portion 62, 63. The second sheet of film is likewise loaded behind the other dark slide 66.

After one or more film holders have been loaded with a particular type of film, the strap 10 with the respective label plate 12 is laid on a flat surface with face 40 confronting the surface. The film holders 14 are then laid on the face 41. When laying on the strap 10, some of the film holders 14 may be rotated 180°, as seen in FIGS. 1 and 2, to level out the stack of film holders 14. Strap end 22 is then slipped through the buckle 23 and drawn back snugly to mate hook connector portion 20 with a section of the loop connector portion 21 to form a secure loop around a set of film holders 14. Since loop connector portion 21 extends for more than one half of the length of the element 11, one strap 10 of a predetermined length may form loops of various sizes around different quantifies of film holders 14. In other words, the strap 10 is incrementally adjustable longitudinally with the sizes of the loops differing only incrementally, given the high concentrations of the hooks and loops in the hook and loop connector portions 20, 21. Likewise, the connection means 13 may be laterally adjusted incrementally relative to the width of the element 11, given the high concentration of the hooks and loops in the hook and loop connector portions 20, 21; in other words, strap 10 allows for less than precise lateral alignment between the hook connector portion 20 and the loop connector portion 21.

At the site of the shooting, the strap 10 may be simply loosened to remove a film holder 14. A film holder 14 containing exposed film is hence easily reinserted into the loosened, but connected, strap 10.

It should be noted that the length of the label plate 12 is less than the width of a 4×5 inch film holder, but is sufficiently great so as to engage frame portions 62, 63 instead of the dark slide 66 when the strap 10 is wrapped laterally about a stack of 4×5 inch film holders. Accordingly, it is less likely that film in an uppermost film holder 14 will be exposed to undesired light or smeared when its respective dark slide 66 is depressed by pressure being brought to bear on the label plate 12 by a photographer writing processing instructions on the plate 12. When the strap 10 is wrapped longitudinally about a stack of film holders 14 as shown in FIG. 1, the large surface area and the rigidity of the plate 12 are features which distribute such pressure and thus minimize depression of the dark slides 66. The portion of the element 11 running behind the label plate 12 may also serve as a cushion to minimize depression of the dark slides 66.

It should be noted that the straps 10 may be organized in a lab by being hung from a strip of loop material affixed to a wall such as with pressure sensitive adhesive. This loop material may be identical to the loop connector portion 21. The hook connector portion 21 engages this loop material to organize and maintain the straps in a readily accessible position.

Although less preferred, it should be noted that the elongate element 11 may alternatively be formed of another adhesive like material such as flexible magnetic strips. These magnetic strips may be incrementally adjustable longitudinally, as well as incrementally adjustable laterally.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. An identifying strap in combination with a film holder for view cameras, the film holder holding two sheets of film and comprising a frame with a divider for separating the sheets of film and a pair of slides for slidable engagement with the frame to cover and protect the sheets of film from exposure to light, the identifying strap extending around one or more film holders and identifying the film therein, comprising:
   1) a flexible elongate durable element with two ends and having a predetermined length;
   2) identifying code means on the flexible element for identifying the type of film in the film holder; and
   3) connection means on the flexible element for connecting portion of the flexible element to form a loop around one or more film holders.

2. The combination of claim 1, wherein the connection means is incrementally adjustable longitudinally to form loops of various sizes around different quantities of film holders.

3. The combination of claim 1, wherein the flexible element has width, the connection means is incrementally adjustable laterally relative to the width of the flexible element to allow connection of the flexible element even with imperfect alignment of the connection means relative to the width of the flexible element.

4. The combination of claim 1, wherein one end of the flexible element includes slip means for slidably engaging the other end of the flexible element to draw the flexible element tightly about one or more film holders.

5. The combination of claim 4, wherein the slip means is swingable relative to the end of the flexible element to which it is connected.

6. The combination of claim 1, wherein the connection means extends more than one-half the length of the flexible element to form loops of various sizes around different quantities of film holders.

7. The combination of claim 1, wherein the connection means extends substantially throughout the length of the flexible element to form loops of various sizes around different quantities of film holders.

8. The combination of claim 1, wherein the connection means includes a hook connector portion and a loop connector portion.

9. The combination of claim 8, wherein one of the connector portions is disposed near one of the ends of the flexible element and the other connector portion extends substantially for a remaining length of the flexible element whereby loops of various sizes may be formed to fit around different quantities of film holders.

10. The combination of claim 9, wherein one of the ends of the flexible element is free of each of the connector portions and thus accessible for gripping purposes to separate the connector portions.

11. The combination of claim 9, and the flexible element having two elongate edges, the connector portions spaced from the edges such that the flexible element is less susceptible to picking up dirt.

12. The combination of claim 1, wherein the code means includes a plate engaging the flexible element, the plate being of sufficient length of engage transverse portions of the frame of the film holder.

13. The combination of claim 1, wherein the flexible element has width, the code means has width and includes two apertures for slidably engaging the flexible element, the width of the code means being greater than the width of the flexible element, the length of the code means being less than the width of the film holder.

14. The combination of claim 1, wherein the flexible element comprises nylon and the connection means comprises nylon to be chemically resistant.

15. The strap of claim 1, wherein the code means includes identification means for identifying a film selected from the following group of film:
   film for exposure to natural light, film for exposure to artificial light, black and white film, half-tone film, or unprocessed and exposed film held back from the processing lab.

16. An identifying strap for holding one or more film holders and identifying the film therein, comprising:
   a) a flexible elongate durable fabric-like element with two ends and having a predetermined length, one end of the flexible element having slip means for slidably engaging the other end of the flexible element;
   b) identifying indicia means engaging the flexible element for identifying the type of film in the film holder; and
   c) connection means on the flexible element for connecting portions of the flexible element to form a loop around one or more film holders, the connection means extending more than one-half the length of the flexible element to form loops of various sizes around different quantities of film holders whereby the flexible element via the slip means is drawable back onto itself to tighten the strap around one or more film holders.

17. The combination of claim 16, wherein the connection means is incrementally adjustable longitudinally to form loops of various sizes around different quantities of film holders.

18. The strap of claim 16, wherein the flexible element has width and the connection means is incrementally adjustable laterally relative to the width of the flexible element to allow connection to the flexible element even with imperfect alignment of the connection means relative to the width of the flexible element.

19. The strap of claim 16, wherein the connection means extends substantially the length of the flexible element to form loops of various sizes around different quantities of film holders.

20. The strap of claim 16, wherein the slip means is rotatably connected to the flexible element.

21. The strap of claim 16, wherein the connection means includes a hook connector portion and a loop connector portion.

22. The strap of claim 21, wherein one of the connector portions is disposed near one of the ends of the flexible element and the other connector portion extends substantially for a remaining length of the flexible element whereby loops of various sizes may be formed to fit around different quantities of film holders.

23. The strap of claim 22, wherein one of the ends of the flexible element is free of each of the connector portions and thus accessible for gripping purpose to separate the connector portions.

24. The strap of claim 22, and the flexible element having two elongate edges, the connector portions spaced from the edges such that the flexible element is less susceptible to picking up dirt.

25. The strap of claim 16, wherein the identifying indicia means includes a plate engaging the flexible element.

26. The strap of claim 16, wherein the flexible element has width and the identifying indicia means has width and also comprises two apertures for slidably engaging the flexible element, the width of the identifying indicia means being greater than the width of the flexible element, the length of the identifying indicia means being less than the width of the film holder.

27. The strap of claim 16, wherein the flexible element comprises nylon and the connection means comprises nylon to be chemically resistant.

28. The strap of claim 16, wherein the identifying indicia means includes means for identifying a film selected from the following group of film:
film for exposure to natural light, film for exposure to artificial light, black and white film, half-tone film, or unprocessed and exposed film held back from the processing lab.

29. An identifying strap in combination with a film holder for view camera, the film holder holding two sheets of film and having a width comprising a frame with a divider for separating the sheets of film and a pair of slides for slidable engagement with the frame to cover and protect the sheets of film from exposure to light, the identifying strap extending around one or more film holders and identifying the film therein, comprising:
1) a flexible elongate durable fabric-like element with two ends, two side edges, and having a width and a predetermined length, one of the ends including slip means for slidably engaging the other end of the flexible element such that the flexible element via the slip means is drawable back onto itself to tighten the strap around one or more film holders, the slip means comprising a tongueless buckle being rotatably connected to the flexible element;
2) identifying indicia means engaging the flexible element for identifying the type of film in the film holder, the identifying indicia means including a plate having a length and width, the length of the plate being less than the width of the film holder, the width of the plate being greater than the width of the flexible element, the plate including two elongate apertures for engaging the flexible element; and
3) connection means on the flexible element for connecting portions of the flexible element, the connection means being incrementally adjustable longitudinally relative to itself to form loops of various sizes around different quantities of film holders, the connection means extending substantially the length of the flexible element, the connection means being incrementally adjustable laterally relative to the width of the flexible element to allow connection even with imperfect alignment of the connection means, the connection means being spaced from one end of the flexible element which is thus accessible for gripping purposes to disconnect the connection means, the connection means also being spaced from the two side edges of the flexible element such that the flexible element is less susceptible to picking up dirt.

* * * * *

UNITED STATES PATENT AND TRADEMARK OFFICE
CERTIFICATE OF CORRECTION

PATENT NO.   : 5,233,380
DATED        : August 3, 1993
INVENTOR(S)  : James Marvy It is certified that error appears in the above-identified patent and that said Letters Patent is hereby corrected as shown below:

Column 6, line 20, delete "4" and replace it with --14--.

Column 10, line 9, delete "camera" and replace it with --cameras--.

Signed and Sealed this

Eighth Day of March, 1994

Attest:

BRUCE LEHMAN

Attesting Officer      Commissioner of Patents and Trademarks